US012749600B2

(12) United States Patent
Karrasch

(10) Patent No.: US 12,749,600 B2
(45) Date of Patent: Sep. 29, 2026

(54) ROTARY BRAID FLARING SYSTEM

(71) Applicant: TE Connectivity Solutions GmbH, Schaffhausen (CH)

(72) Inventor: Christopher John Karrasch, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 827 days.

(21) Appl. No.: 18/306,608

(22) Filed: Apr. 25, 2023

(65) Prior Publication Data

US 2024/0363267 A1 Oct. 31, 2024

(51) Int. Cl.
*H01B 13/26* (2006.01)

(52) U.S. Cl.
CPC ................................ *H01B 13/2606* (2013.01)

(58) Field of Classification Search
CPC .. H01B 13/2606; H01R 9/0518; H01R 43/28; H02G 1/1297; Y10T 29/49123; Y10T 29/49174; Y10T 29/53209
See application file for complete search history.

(56) References Cited

U.S. PATENT DOCUMENTS

| | | | | |
|---|---|---|---|---|
| 6,330,839 | B1 * | 12/2001 | Amrein | H02G 1/1273 81/9.51 |
| 7,395,592 | B2 * | 7/2008 | Matsumura | H01R 43/28 29/33 F |
| 9,520,700 | B2 * | 12/2016 | Stepan | B26D 7/08 |
| 10,840,680 | B2 * | 11/2020 | Houser | H02G 1/1265 |
| 11,342,732 | B2 * | 5/2022 | Boccato | H02G 1/1297 |
| 2020/0328582 | A1 * | 10/2020 | Whittmann | H02G 1/1285 |

* cited by examiner

*Primary Examiner* — Donghai D Nguyen

(57) ABSTRACT

A cable processing system includes a cable processing tool rotatable about a first axis, a first rotary actuator and a rotating assembly operatively connected to the first rotary actuator. The rotating assembly includes a planetary gearset and simultaneously rotates the cable processing tool about the first axis and a second axis, distinct from the first axis, in response to rotation of the first rotary actuator.

20 Claims, 10 Drawing Sheets

ROTARY BRAID FLARING SYSTEM

FIELD OF THE INVENTION

The present disclosure relates to the field of cable preparation, and more specifically, to a system for flaring or dressing an end of a braided shielding layer of an electrical cable.

BACKGROUND

When preparing a shielded cable for connectorization or termination, it is often necessary to flare or open the end of one or more layers of the cable, such as a braided shielding layer. This process is generally performed by hand using manual tools. As a result, these flaring or dressing operations are time consuming and produce inconsistent outcomes. This can result in failures or degradation in connection performance.

Improved solutions for flaring or dressing one or more layers of a cable are desired.

SUMMARY

In one embodiment of the present disclosure, a cable processing system includes a cable processing tool rotatable about a first axis, a first rotary actuator and a rotating assembly operatively connected to the first rotary actuator. The rotating assembly includes a planetary gearset and rotates the cable processing tool about the first axis and a second axis, distinct from the first axis, simultaneously in response to rotation of the first rotary actuator.

BRIEF DESCRIPTION OF THE DRAWINGS

The invention will now be described by way of example with reference to the accompanying Figures, of which.

DETAILED DESCRIPTION OF THE EMBODIMENTS

Figure 1:
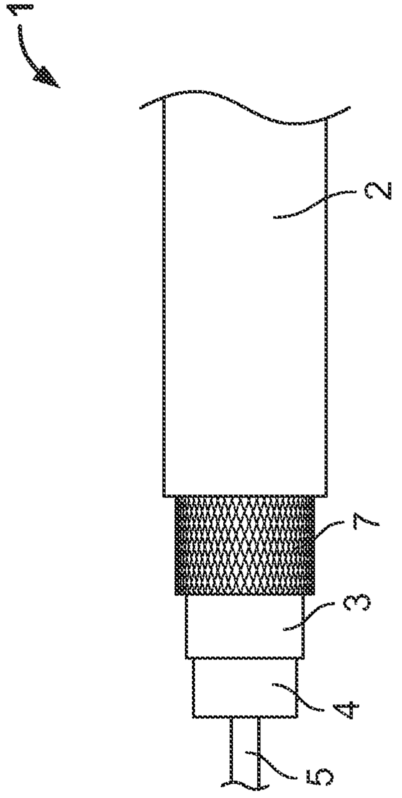
FIG. 1 is a side view of an exemplary cable useful for describing embodiments of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure is directed to a braid flaring system or machine that includes a dual rotating brush driven by a single motor for performing a braid flare on a braided cable layer. The system utilizes a planetary gearset as part of a rotating assembly in order to rotate a brush simultaneously about two discrete axes (e.g., perpendicularly oriented axes). Specifically, the rotating assembly holds the brush and rotates it about its central axis while simultaneously rotating the whole assembly about an axis of the cable under processing. While being rotated, the brush engages with an exposed braided layer of the cable proximate a free end thereof. As the brush is rotated about the axis of the cable, the braid is flared radially outward and rearward, or folded back over itself or another component, such as a ferrule fixed to the cable prior to the performance of the flaring operation. The flared braid may expose, for example, a shielding layer of the cable. Once flared, the cable may be subject to further processing, for example, connectorization or termination including the fixation of a terminal on the dressed free end of the cable.

Referring to FIG. 1, an exemplary cable 1 useful for describing embodiments of the present disclosure is shown. The cable 1 has been partially stripped in order to illustrate its components or concentric layers. Specifically, the cable 1 includes an outer insulation layer or jacket 2, a metallic braid or braided shielding layer 7, a conductive foil shield 3, an inner insulation or dielectric layer 4 and an inner conductor 5.

Figure 2:
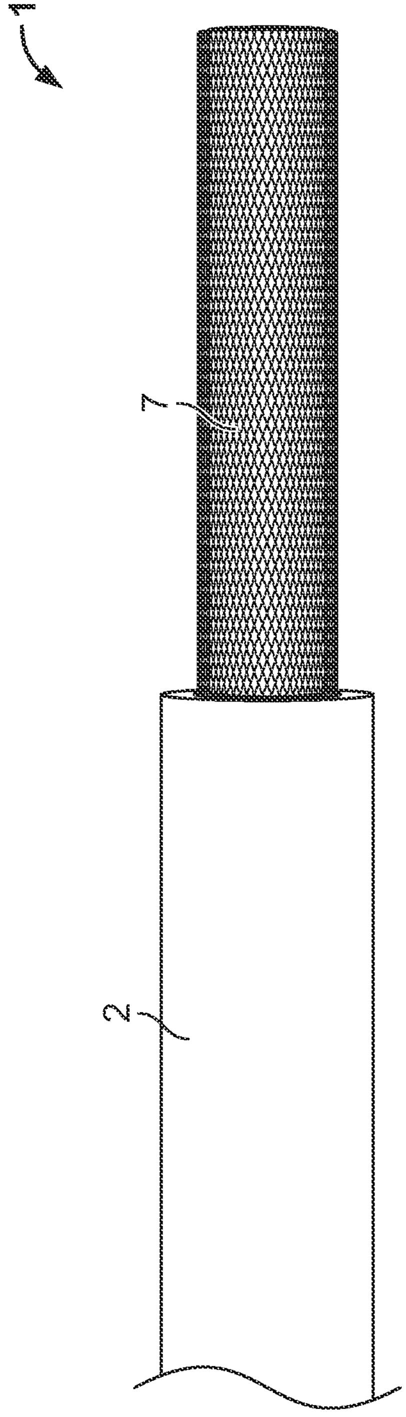
FIG. 2 is a side view of the cable of FIG. 1 in an intermediate step of processing including removal of a portion of an outer jacket to reveal a braided shielding layer or braid.
Figure 3:
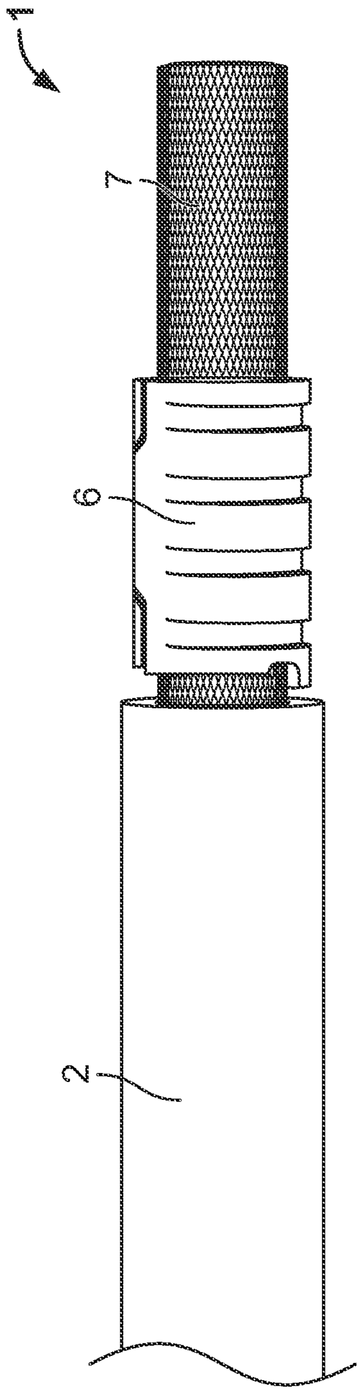
FIG. 3 is a side view of the cable of FIG. 2 with a ferrule attached over the braided shielding layer.
Figure 4:
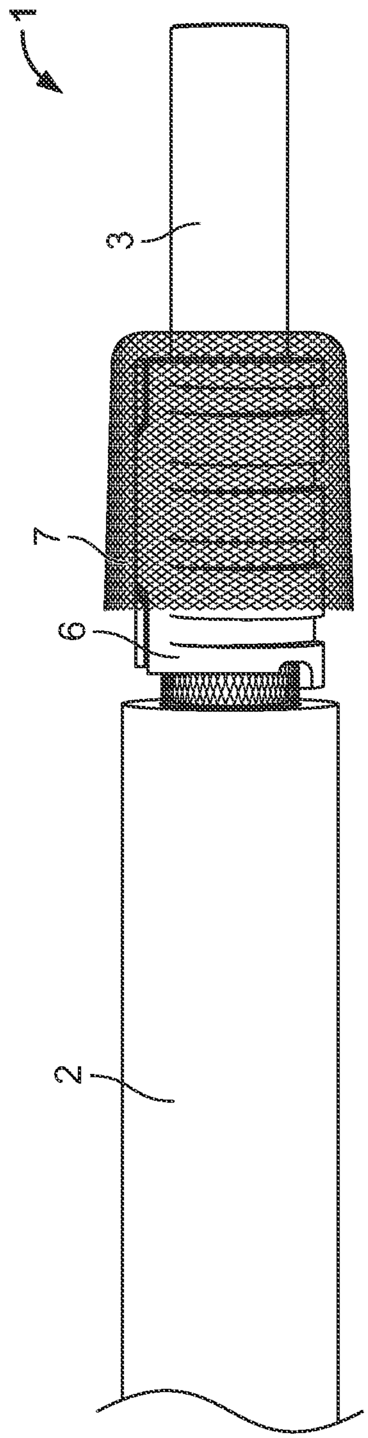
FIG. 4 is a side view of the cable of FIG. 3 with a portion of the braided shielding layer folded or brushed backwards over the ferrule in a dressed state.

FIGS. 2-4 illustrate exemplary processing steps required to prepare the cable 1 for connectorization and/or termination. In a first step as shown in FIG. 2, an end portion of the cable jacket 2 is removed, exposing the braid 7. Referring to FIG. 3, a ferrule 6 is then crimped over the exposed braid 7 adjacent the cable jacket 2. With the ferrule 6 in place, the braid 7 is folded backward or dressed (e.g., brushed) over the ferrule, overlapping itself in a radial direction, as shown in FIG. 4. According to the prior art, these braid flaring and folding steps are typically performed manually, and thus are time consuming and generally inconsistent. Embodiments of the present disclosure include cable processing systems for more efficiently and accurately performing these operations, including systems operating under automatic and/or computer control, allowing for integration into automated production lines and improved accuracy and efficiency.

Figure 5:
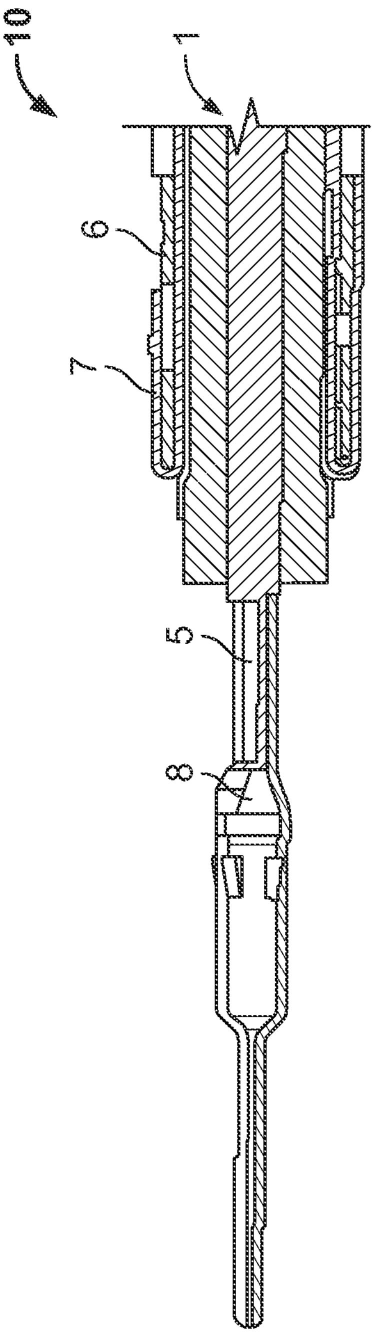
FIG. 5 is a side cross-sectional view of the cable of FIG. 4 with a first or center contact attached thereto.
Figure 6:
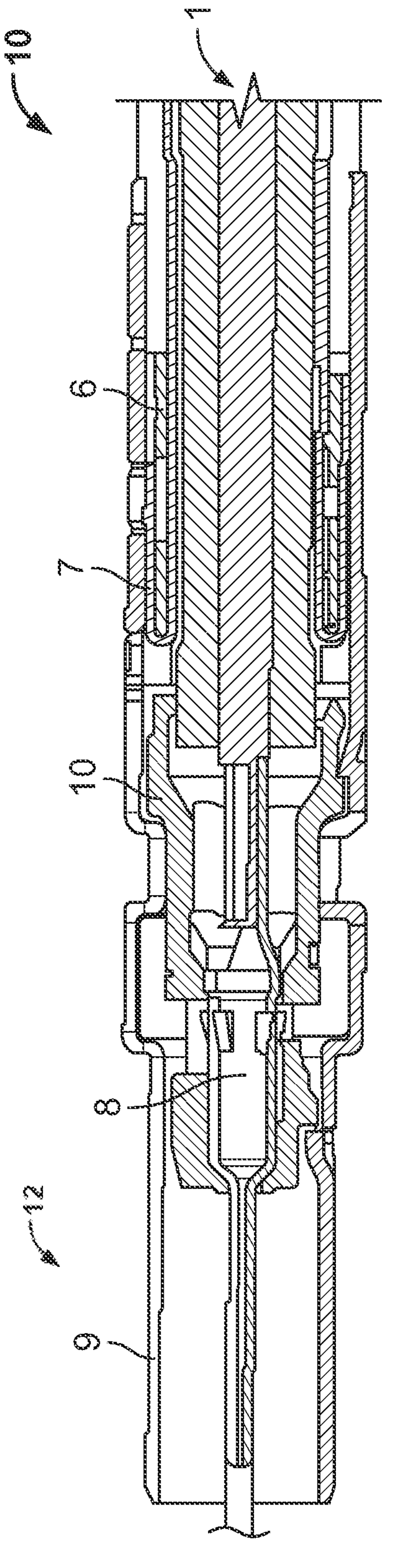
FIG. 6 is a side cross-sectional view of the cable of FIG. 5 with a second or outer contact attached thereto.

With the cable prepared in accordance with the operations shown in FIGS. 2-4, and referring generally to FIGS. 5 and 6, an exemplary termination operation includes applying contacts or terminals to the cable. Specifically, referring to FIG. 5, a cable subassembly 10 is shown, including the cable 1, the ferrule 6 applied thereto, and a terminal or center contact 8 (e.g., a pin or a socket terminal). From the form shown generally in FIG. 4, the center contact 8 is fixed to the inner conductor 5 (e.g., via soldering, welding and/or crimping). Referring to FIG. 6, after fixation of the center contact 8, the center contact is inserted into a connector assembly 12 containing a center dielectric 11 and an outer contact 8. The connector assembly 12 is then affixed to, for example, the ferrule 6 and/or the jacket 2 via crimping. In this way, the outer contact 9 is placed into conductive contact with the braid 7 in the area of the ferrule 6.

Figure 7:
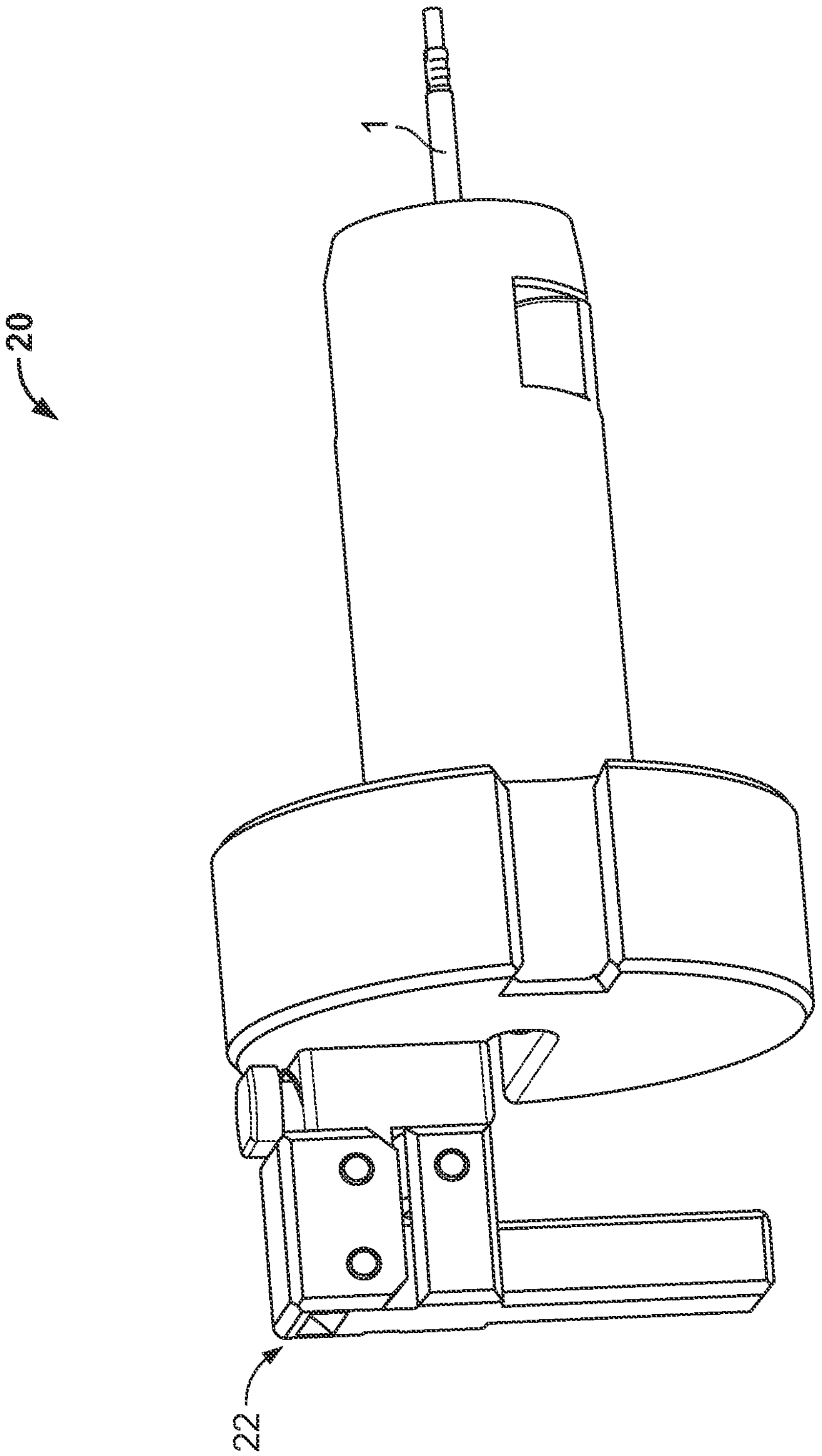
FIG. 7 is a perspective view of an exemplary cable holder of a cable processing system according to embodiments of the present disclosure.
Figure 8:
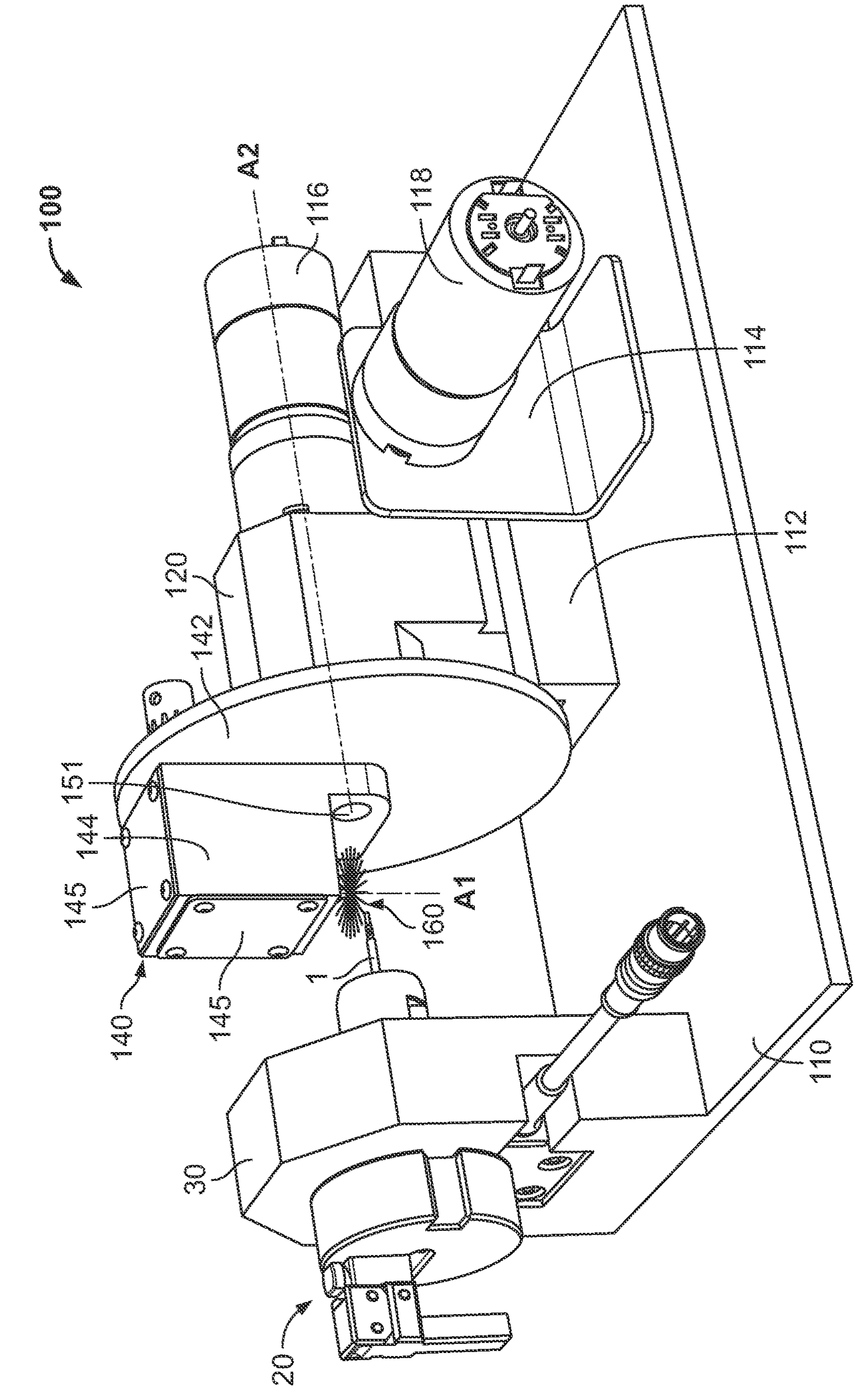
FIG. 8 is a perspective view of a cable processing system according to an embodiment of the present disclosure.
Figure 9:
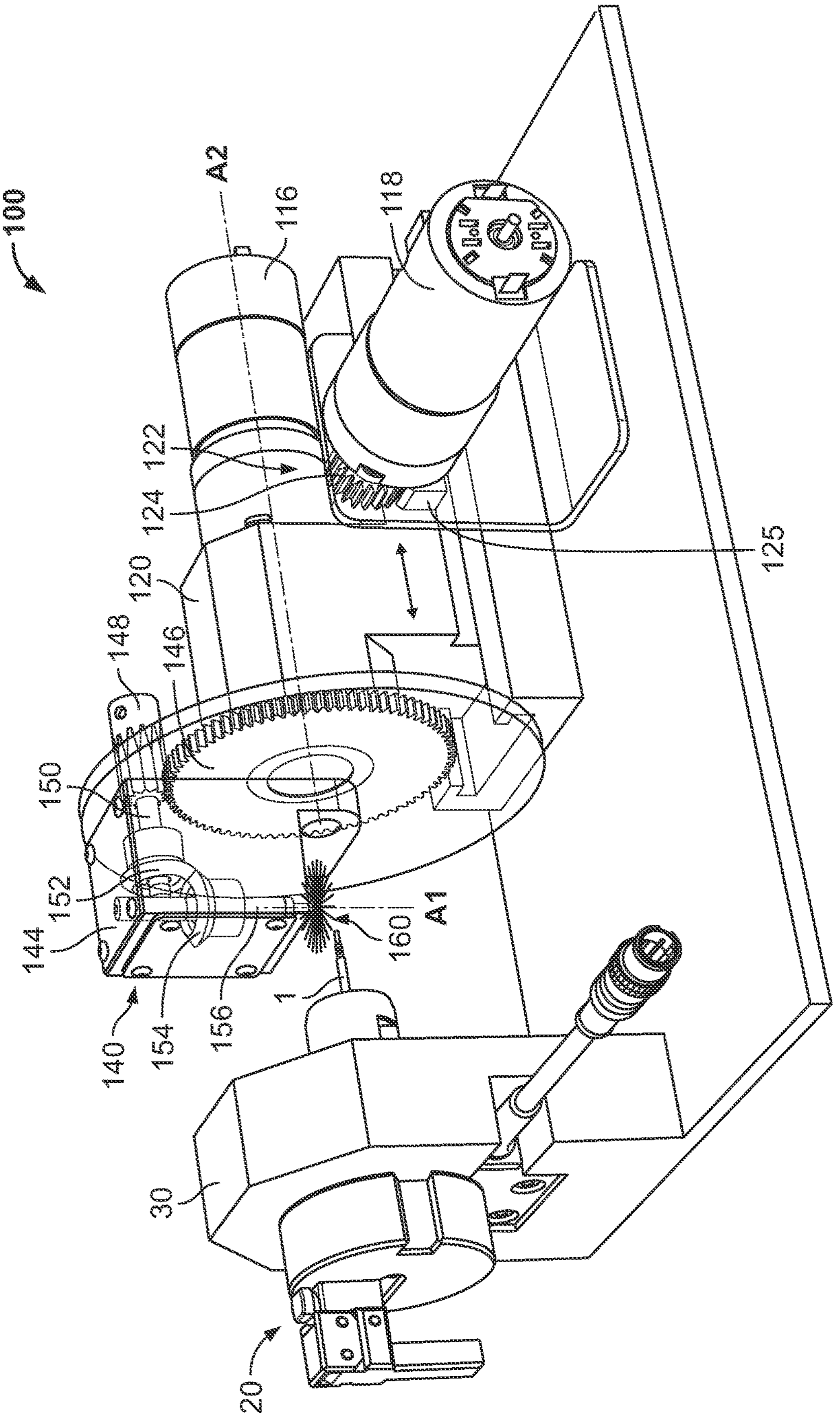
FIG. 9 is another perspective view of the cable processing system of FIG. 8 with internal components of a rotating assembly thereof shown in detail.

Referring to FIGS. 7-9, an automated cable processing system or brushing station 100 according to an embodiment of the present disclosure is shown. As set forth above, the system 100 is adapted to perform the steps of flaring and folding the braid 7 of the cable 1 into the position shown in FIG. 4. FIG. 7 illustrates a cable holder 20 used in the system 100 for accurately positioning the cable 1 for processing. Specifically, the cable holder 20 includes a generally cylindrical body in which the cable 1 is coaxially arranged. The cable 1 may be held within the cable holder 20 via a locking lever 22 operative to selectively clamp the cable 1 in a fixed position relative to the holder. As shown in FIG. 8, a cable holder receiver assembly 30 defines an aperture sized to receive the cylindrical body of the cable holder 20 therethrough, thus enabling the repeatable, accurate positioning of a free end of the cable 1 prior to processing.

As set forth in detail herein, the system 100 is operative to rotate a cable processing tool 160 (e.g., a brush) simultaneously about a first axis A1 (e.g., central rotating axis of the tool) and a second axis A2 (e.g., an axis coaxially aligned with a central axis of the cable 1), as well as translate the processing tool along direction(s) of the second axis. This compound motion of the processing tool 160 is operative to flare and fold the braid 7 of the cable 1 in an accurate and repeatable manner.

Still referring to FIG. 8, the system 100 generally includes a base 110 on which the receiver assembly 30, a slide base 112 and an actuator mount or bracket 114 are fixedly attached. An assembly base 120 is slidably mounted on the slide base 112, and is movable along direction(s) of, or parallel to, the second axis A2. The assembly base 120 supports a rotating assembly 140. The rotating assembly 140 is driven by a first rotary actuator or motor 116. The first actuator 116 is fixedly mounted to the assembly base 120. In the exemplary embodiment, a rotating axis or output of the first actuator 116 is coaxially aligned with the second axis A2 (and the cable 1), however, other arrangements are also possible without departing from the scope of the present disclosure.

A second actuator 118 is fixedly attached to the actuator mount 114. As shown in FIG. 9, a pinion gear 124 is selectively driven by the actuator 118. In turn, the pinion gear 124 engages with a toothed rack 125 arranged or formed on the rotating assembly base 120. This rack and pinion arrangement 122 is operative to selectively bias the rotating assembly base 120 along directions of the second axis A2 in response to rotation of the actuator 118. However, linear translation of the rotating assembly 140 or the rotating assembly base 120 may be achieved via alternative arrangements, such as via a linear actuator arranged between the rotating assembly base 120 and the base 110, without departing from the scope of the present disclosure.

The rotating assembly 140 is rotationally attached to the base 120 via a plate 142 and shaft 151 and operatively connected to a rotating output of the first rotary actuator 116. The rotating assembly 140 is adapted to rotate the cable processing tool 160 about the first axis A1 and the second axis A2 simultaneously in response to rotation of the first rotary actuator 116. In the exemplary embodiment, the rotating assembly includes a planetary gearset (i.e., an epicyclic gear train). The gearset includes a sun gear 146 rigidly mounted to the assembly base 120 and at least one planet gear 148 operatively connected thereto. In response to the rotation of the rotating assembly 140 about the sun gear 146, the planet gear 148 is rotated both about its central axis, and the second axis A2.

As shown most clearly in FIG. 9, rotation of the planet gear 148 about its central axis is operative to rotate the cable processing tool 160 about the first axis A1. Specifically, the rotating assembly 140 further includes a gearbox 144 having a first bevel gear 152 and a second bevel gear 154 engaged with the first bevel gear. The first bevel gear 152 is driven by the rotation of the planet gear 148 via a shaft 150 arranged therebetween. The second bevel gear 154 engages with the first bevel gear, and is rotated thereby. The second bevel gear 154 is connected to the cable processing tool 160 via a second shaft 156. In this way, rotation of the planet gear 148 about its central axis rotates the cable processing tool 160 about the first axis A1. The exemplary gearbox 144 and bevel gears 152,154 define a right-angle drive or gearset for altering the orientation of the axis of rotation of the cable processing tool 160. In this way, the first axis A1 and the second axis A2 are oriented perpendicularly to one another during operation of the system 100. However, while a right-angle drive arrangement is shown, embodiments of the present disclosure are not limited to this configuration. Access to the components of the gearbox 144 may be provided by multiple access covers 145, as shown in FIG. 8.

The gearbox 144 may be embodied as a carrier to which the planet gear 148 is mounted. Specifically, as the rotating assembly 140 is rotated about the sun gear 146 by the actuator 116, the planet gear 148 rotates. This drives the gearbox or carrier 144 and the planet gear 148 about the second axis A2. The gearbox 144 may be rotatable mounted to the base 120 via, for example, the plate 142 and the shaft or pin 151. The rotation of the gearbox 144 and planet gear 148 about the sun gear 146 is illustrated in the exemplary distinct radial positions shown in FIGS. 9 and 10. As indicated by the arrows in FIG. 10, the simultaneous, compound motion of the rotating assembly 140 is shown during a flaring operation performed on the cable 1. Specifically, the assembly 140 is biased linearly in a direction toward the cable 1 (e.g., via the rack and pinion 122) as the rotating assembly 140 is rotated about the second axis A2 via the first rotary actuator 116, and the cable processing tool 160 is rotated about its central axis or the first axis A1.

The exemplary cable processing tool 160 is embodied as a brush (e.g., having polymer or metallic bristles), and is sized and shaped (i.e., adapted) to flare the braid 7 of the cable 1. Specifically, as shown in FIGS. 11-14, in response to rotation about the first and second axes A1,A2 and linear motion along a direction of the second axis, the cable processing tool 160 flares an exposed portion of the braid 7 of the cable 1 in a radially-outward direction. See FIGS. 11 and 12. Moreover, the linear translation of the cable processing tool 160 in the indicated direction is operative to fold back the flared portion of the braid 7 such that it overlaps an unfolded portion of the braid in a radial direction. See FIGS. 13 and 14. In the exemplary embodiment, this braid dressing operation includes folding the braid 7 back and over the installed ferrule 6.

The following is a description of an exemplary operator process for dressing a cable utilizing the system 100. Referring to FIGS. 7-9, a user or an operator will place a cable 1 though the cable holder 20 (e.g., through a rear opening thereof), and fix the cable therewithin via the locking lever or clamp 22. The cable holder 20 is then placed into the receiver assembly 30, aligning the central axis of the cable 1 with the second axis A2. In response to a control signal or a user input, the first rotary actuator 116 will rotate its output (e.g., its output shaft), causing the rotating assembly 140 to rotate about the second axis A2 in the above-described manner. Specifically, referring to FIG. 9, rotation of the rotating assembly 140 about the sun gear 146 causes the planet gear 148 to rotate relative to the rotating assembly 140. Rotation of the planet gear 148 causes rotation of the planet bevel gear 152 via the planet gear shaft 150. The planet bevel gear 152 is gear connected to the brush bevel gear 154 such that when planet bevel gear rotates it causes a rotation of brush bevel gear. The brush bevel gear 154 is attached to the cable processing tool or brush 160 through the brush shaft 156 such that when brush bevel gear rotates, the brush rotates. As the actuator 116 rotates the rotating assembly 140 about the second axis A2 of the rotating assembly base 120, the linear actuation motor or second actuator 118 will causes the pinion gear 124 to rotate. The pinion gear 124 is engaged in a gear relationship with gear rack 125 such that a rotation of pinion gears causes a linear translation of gear rack 125.

Figure 10:
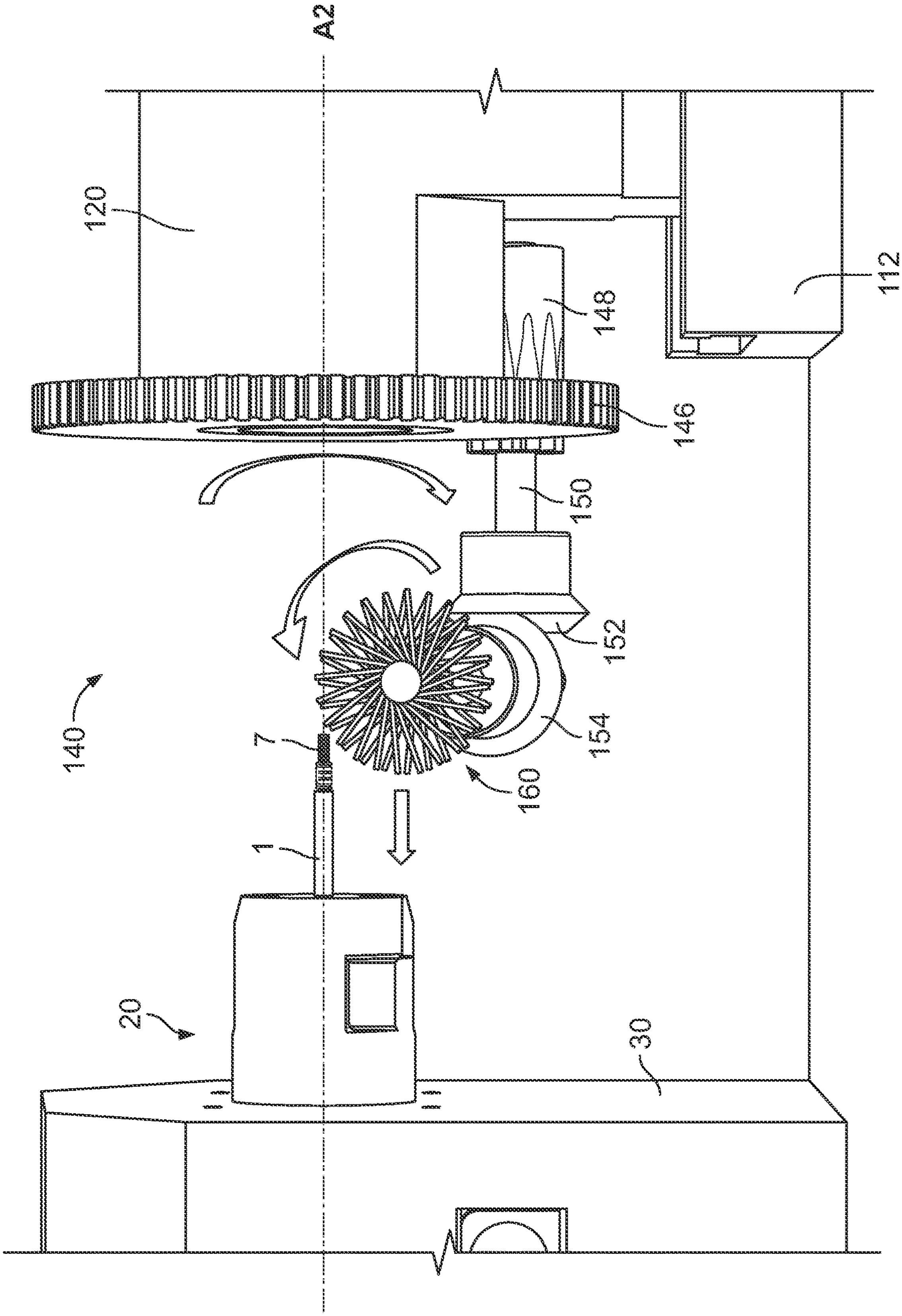
FIG. 10 is a side view of the cable processing system of FIG. 8 with components of the rotating assembly shown in an exposed state.
Figure 11:
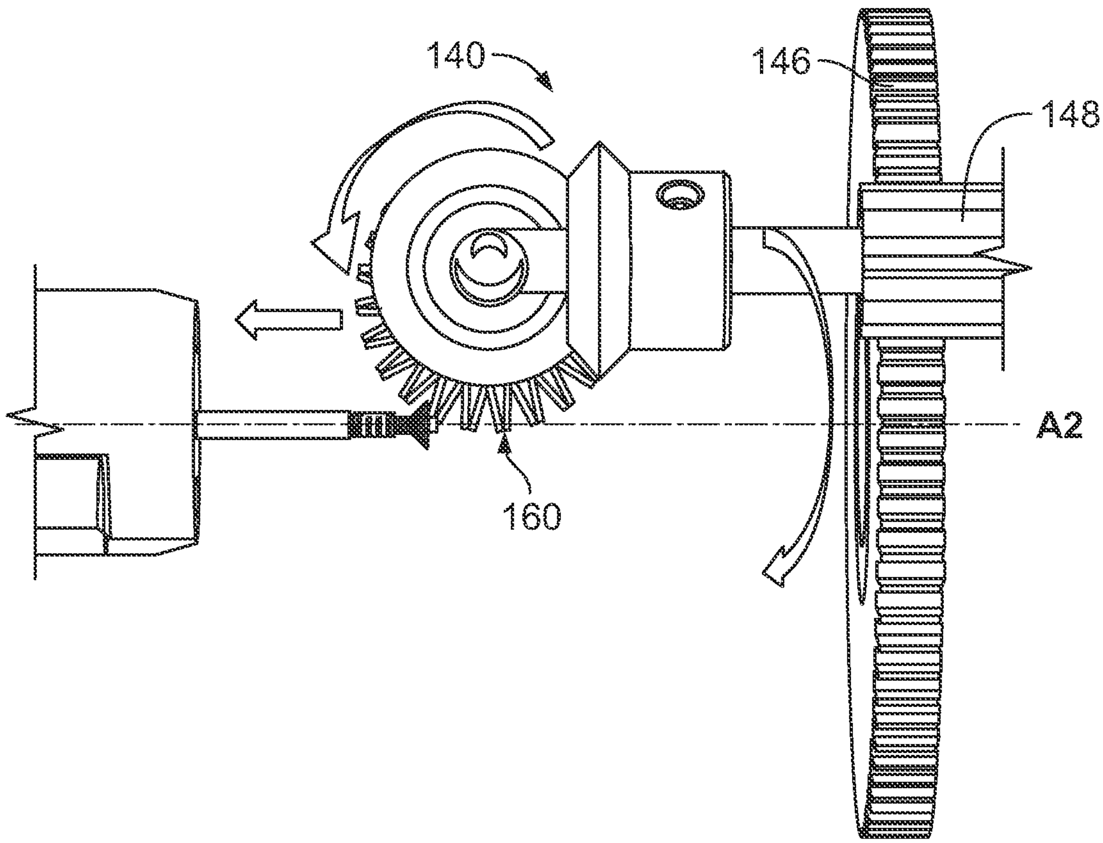
FIG. 11 is a side perspective view of a portion of the cable processing system of FIG. 10 as it begins to process a braided shielding layer of an exemplary cable.
Figure 12:
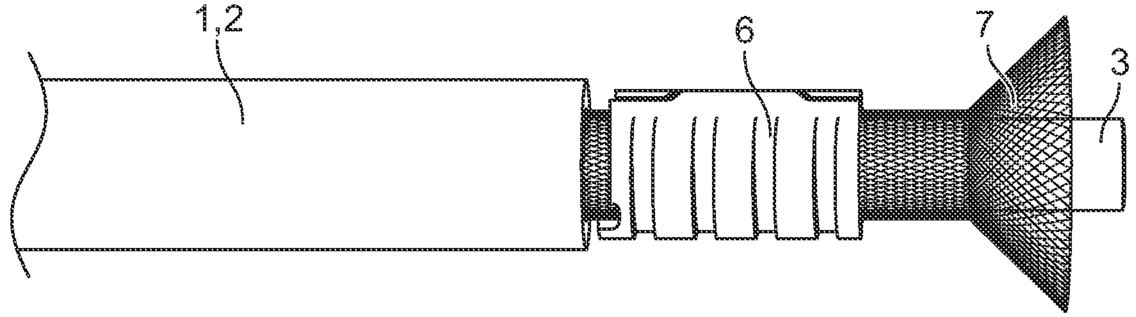
FIG. 12 is a side perspective view of the cable shown in FIG. 11 in an intermediate state of processing.
Figure 13:
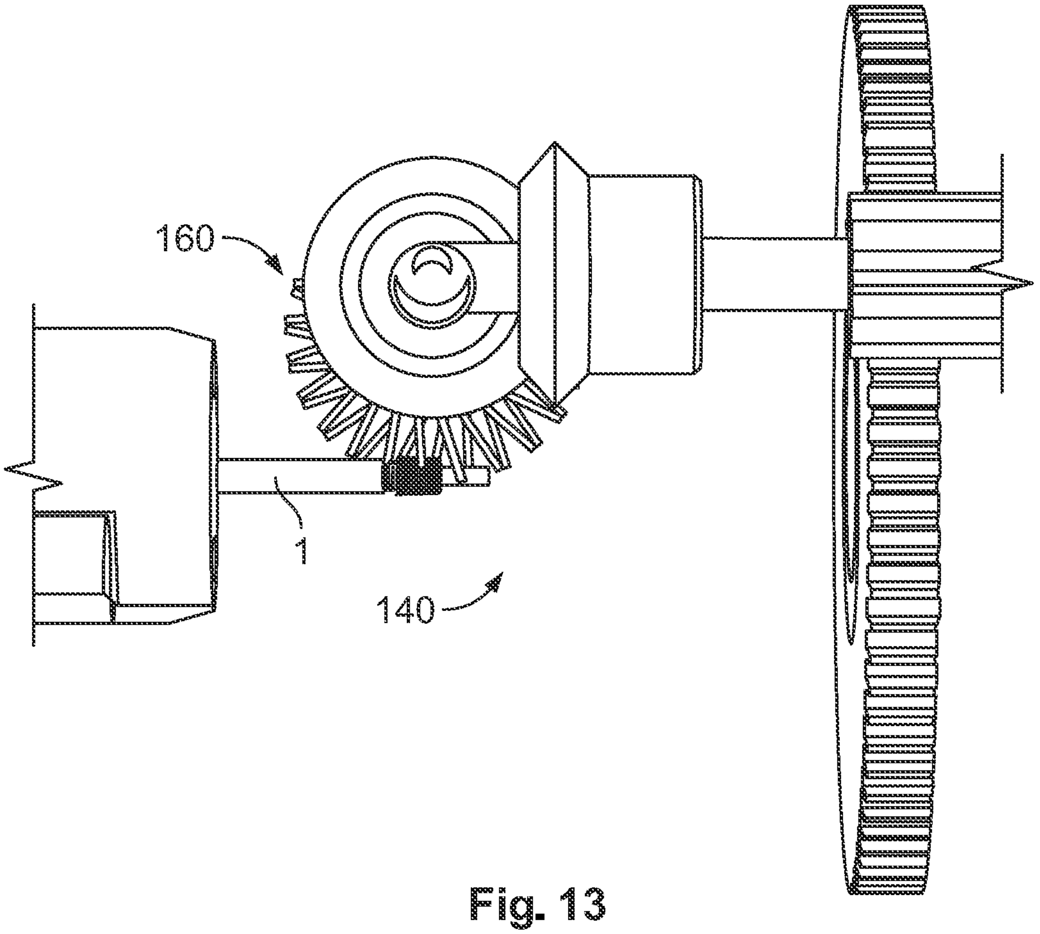
FIG. 13 is another side perspective view of a portion of the cable processing system of FIG. 10 after it has processed the braided shielding layer of the cable.
Figure 14:
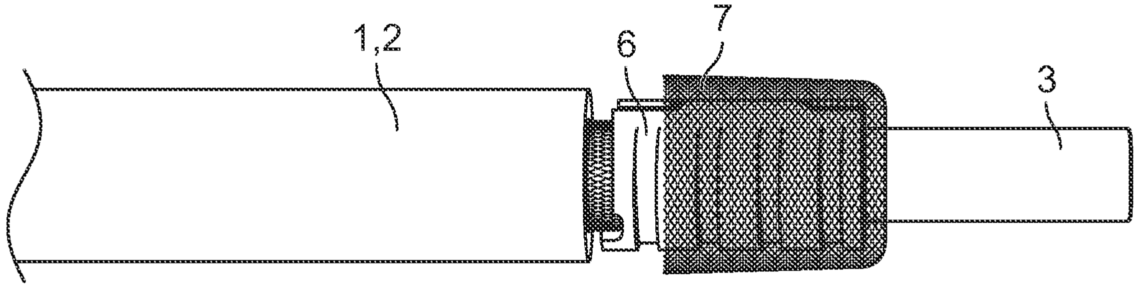
FIG. 14 is a side perspective view of the cable shown in FIG. 13 with the braided shielding layer in a dressed position or state after processing.

With reference now to FIG. 10, rotation of the rotating assembly 140 causes the brush 160 to rotate the brush bristles toward the cable braid 7 while also rotating around the second axis A2. While the brush rotation is occurring, the second actuator 118 causes the brush 160 to move toward the cable holder 20. As the rotating assembly 140 moves toward the cable holder 20, the rotating bristles of brush 160 will engage the braid 7 and lift it away from the cable dielectric 3, as shown in FIGS. 11 and 12. Continued movement of the rotating assembly 140 toward the cable holder 20 causes the rotating bristles of brush 160 to fold the braid 7 back over the ferrule 6, as shown in FIGS. 13 and 14. Once the braid 7 is folded back over the ferrule 6 the linear actuation motor or second actuator 118 will reverse directions to move the brush 160 away from the cable holder 20, while the rotating assembly 140 continues rotating to prevent the brush from unfolding the braid.

Figure 15:
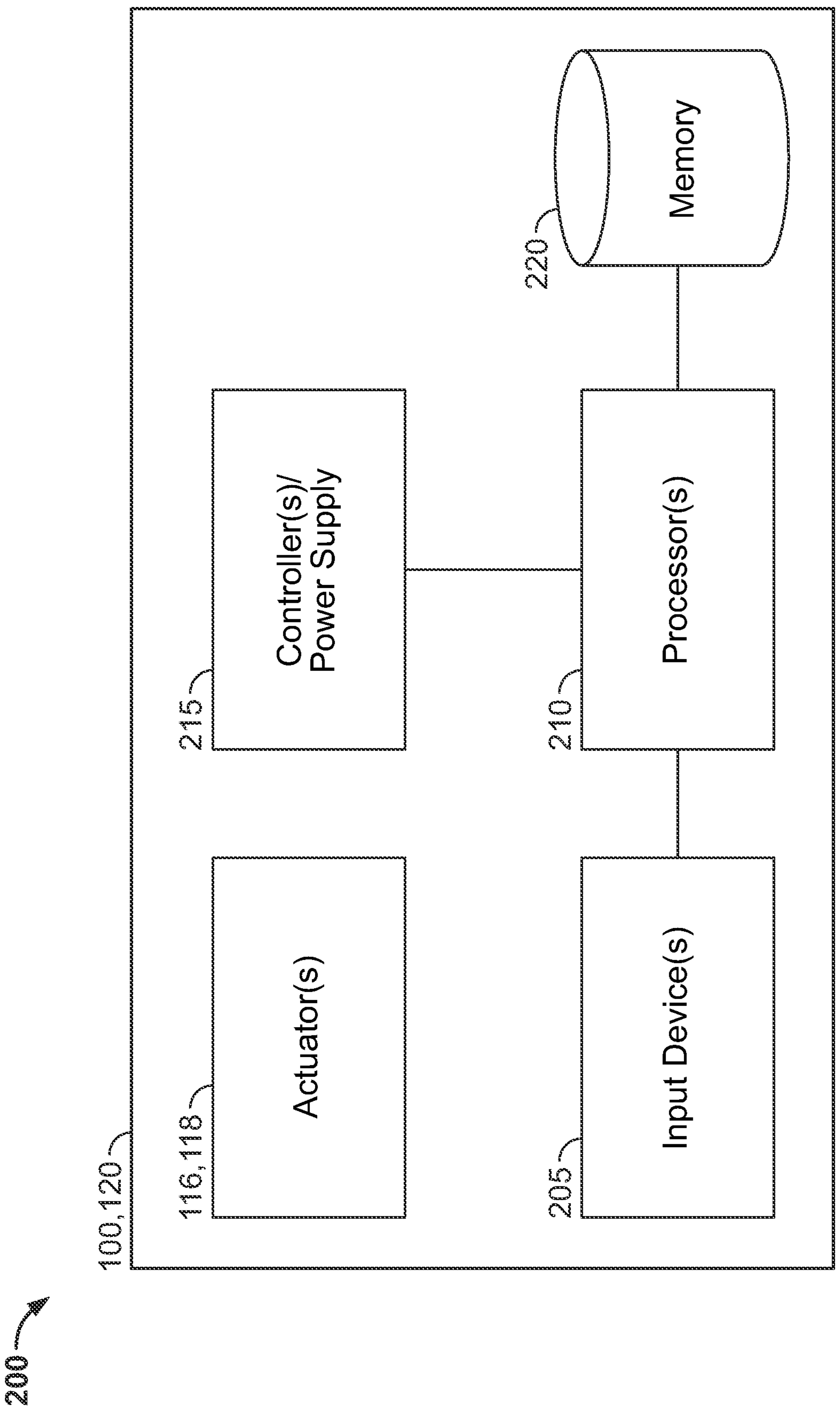
FIG. 15 is a simplified view of a control system which may be used in conjunction with the cable processing system for performing methods according to embodiments of the present disclosure in an automated manner.

The cable processing methods according to embodiments of the present disclosure may be carried out wholly or partially by one or more automated control systems implementing and/or controlling the above-described components, as well as additional hardware and software features. For example, referring generally to FIG. 15, an exemplary control system 200 useful for performing the operations of the embodiments of the present disclosure is shown. The control system 200 may be under fully automated control (i.e., without user input), or fully or partially controlled via one or more user input devices 205 (e.g., touch screen/buttons/keyboards, etc.). The control system 200 includes at least one processor 210, such as a digital microprocessor responsive to instructions stored on a programmable memory device 220 for performing the methods or operations described herein. The processor 210 is operatively coupled to the first and second actuators 116,118 via one or more controllers (e.g., motor controllers) and/or a power supply 215 thereof for selectively powering the actuators to drive the system 100 as described above. The control system 200 may be contained on or within the system 100 (e.g., within the rotating assembly base 120), or may be located remotely therefrom and operatively connected thereto via wired or wireless connection(s), as would be understood by one of ordinary skill in the art.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable processing system, comprising:

a cable processing tool rotatable about a first axis;

a first rotary actuator; and a rotating assembly operatively connected to a rotating output of the first rotary actuator, the rotating assembly is configured to simultaneously rotate the cable processing tool about the first axis and a second axis in response to rotation of the first rotary, wherein the second axis is distinct from the first axis.

2. The cable processing system of claim 1, wherein the rotating assembly includes a planetary gearset.

3. The cable processing system of claim 2, wherein the planetary gearset includes:

a fixed sun gear; and a planet gear operatively connected to the sun gear, in response to rotation of the planet gear about the sun gear, the planet gear is rotated both about its central axis, and the second axis about the sun gear.

4. The cable processing system of claim 3, wherein rotation of the planet gear about a central axis of the planet gear rotates the cable processing tool about the first axis.

5. The cable processing system of claim 4, wherein the rotating assembly further includes a gearbox having a first bevel gear and a second bevel gear engaged with the first bevel gear, the first bevel gear fixedly connected to the planet gear and the second bevel gear fixedly connected to the cable processing tool.

6. The cable processing system of claim 5, wherein the gearbox is rotated about the second axis in response to the rotation of the output of the first rotary actuator.

7. The cable processing system of claim 1, wherein the first axis and the second axis are oriented perpendicularly to one another.

8. The cable processing system of claim 7, wherein a rotational axis of the first rotary actuator is coaxially aligned with the second axis.

9. The cable processing system of claim 8, further comprising a cable holder adapted to hold a cable, the cable held with a central axis of the cable coaxially aligned with the second axis.

10. The cable processing system of claim 1, further comprising a second actuator selectively translating the cable processing tool along a direction of the second axis.

11. The cable processing system of claim 10, wherein the second actuator comprises a second rotary actuator.

12. The cable processing system of claim 11, further comprising:

a rotating assembly base on which the cable processing tool, the first rotary actuator and the rotating assembly are mounted;

a slide base on which the rotating assembly is slidable mounted;

a rack gear arranged on the rotating assembly base; and a pinion gear connected to an output of the second rotary actuator and engaged with the rack gear, the rotating assembly translated along the direction of the second axis in response to rotation of the second rotary actuator.

13. The cable processing system of claim 1, wherein the cable processing tool includes a brush adapted to flare a braided shield of a cable.

14. The cable processing system of claim 1, further comprising a cable including an exposed braided layer, wherein in response to rotation about the first and second axes and linear translation along the direction of the second axis, the cable processing tool:

flares an exposed portion of the braided layer of the cable; and folds back the flared portion of the braided layer of the cable such that it overlaps an unfolded portion of the braided layer in a radial direction.

15. The cable processing system of claim 14, wherein the cable further includes a ferrule fixed to the braided layer, in response to rotation about the first and second axes and linear translation along the direction of the second axis, the cable processing tool folds the exposed portion of the braided layer over the ferrule.

16. A cable processing system, comprising:

a rotating assembly including a planetary gearset;

a cable processing tool operatively connected to the rotating assembly;

a first actuator operatively connected to the rotating assembly, the first actuator driving the rotating assembly and rotating the cable processing tool about first and second discrete axes simultaneously; and a second actuator biasing the cable processing tool in a direction of the second axis.

17. The cable processing system of claim 16, wherein the planetary gearset includes:

a sun; and a planet gear operatively connected to the sun gear, in response to rotation of the planet gear about the sun gear, the planet gear is rotated about both a central axis of the planet gear, and the second axis about the sun gear.

18. The cable processing system of claim 17, wherein the rotating assembly includes a right-angle gearset rotating the cable processing tool about the first axis, wherein the first axis and the second axis oriented perpendicularly to one another and a rotational axis of the first actuator is coaxially aligned with the second axis.

19. The cable processing system of claim 16, wherein in response to rotation about the first and second axes and linear motion along a direction of the second axis, the cable processing tool is adapted to:

flare an exposed portion of a braided layer of a cable; and fold back the flared portion of the braided layer of the cable such that it overlaps an unfolded portion of the braided layer in a radial direction.

20. The cable processing system of claim 16, further comprising a cable holder adapted to fix a cable relative to the rotating assembly such that a central axis of the cable is aligned with the second axis.

* * * * *